United States Patent [19]

Chamberlain et al.

[11] Patent Number: 4,618,525

[45] Date of Patent: Oct. 21, 1986

[54] COATED GLASS MICROBUBBLES AND ARTICLE INCORPORATING THEM

[75] Inventors: Craig S. Chamberlain, Woodbury; George F. Vesley, Hudson; Patrick G. Zimmerman, St. Paul; Jerome W. McAllister, Hudson, all of Minn.

[73] Assignee: Minnesota Mining and Manufacturing Company, St. Paul, Minn.

[21] Appl. No.: 740,577

[22] Filed: Jun. 3, 1985

[51] Int. Cl.$^4$ .............................................. B32B 3/00
[52] U.S. Cl. .................................... 428/209; 428/210; 428/325; 428/333; 428/336; 428/406; 428/428; 428/432; 428/698; 428/433; 428/434; 501/34; 521/54; 523/219
[58] Field of Search ............... 428/406, 195, 209, 210, 428/212, 215, 217, 325, 333, 336, 428, 432, 698, 433, 434; 427/212, 215, 217; 521/54; 523/219; 501/34, 80

[56] References Cited

U.S. PATENT DOCUMENTS

| | | | |
|---|---|---|---|
| 2,846,971 | 8/1958 | Baer et al. | 113/49 |
| 3,192,064 | 6/1965 | Cerych et al. | 117/100 |
| 3,365,315 | 1/1968 | Beck et al. | 106/40 |
| 3,826,226 | 7/1974 | Clark | 118/49.1 |
| 4,046,712 | 9/1977 | Cairns | 252/447 |
| 4,223,067 | 9/1980 | Levens | 428/308 |
| 4,288,337 | 9/1981 | Ota et al. | 428/406 |
| 4,340,642 | 7/1982 | Netting et al. | 428/406 |
| 4,353,951 | 10/1982 | Yukitoshi et al. | 428/406 |
| 4,391,646 | 7/1983 | Howell | 106/97 |

FOREIGN PATENT DOCUMENTS

1507667  4/1978  United Kingdom.

OTHER PUBLICATIONS

Wise et al, "High Dispersion Platinum Catalysts by RF Sputtering", Journal of Catalysis, vol. 83, pp. 477–479 (1983).

"Microencapsulation Utilizing Vacuum Evaporation Deposition", included in Proceedings of the Third International Symposium of Microencapsulation, Tamotsu Kondo, Ed., pp. 166–170 (1976).

*Primary Examiner*—George F. Lesmes
*Assistant Examiner*—P. R. Schwartz
*Attorney, Agent, or Firm*—Donald M. Sell; James A. Smith; Richard E. Brink

[57] ABSTRACT

The invention concerns glass microbubbles having an inorganic thin-film coating not exceeding about 10 nm in thickness, especially a coating of a metal, a metalloid, or an alloy thereof. When dispersed throughout a matrix such as a polymer, the coated glass microbubbles can afford surprisingly good hiding power while also imparting esthetically pleasing colors to otherwise transparent articles.

21 Claims, No Drawings

COATED GLASS MICROBUBBLES AND ARTICLE INCORPORATING THEM

FIELD OF THE INVENTION

The invention concerns glass microbubbles having an inorganic thin-film coating, especially a coating of metal, a metalloid, or an alloy thereof.

BACKGROUND ART

Foam-backed pressure-sensitive adhesive tape is commonly used to adhere an article to a substrate. The foam backings of such tapes often are pigmented with carbon black to camouflage their presence.

U.S. Pat. No. 4,223,067 (Levens) discloses a pressure-sensitive adhesive tape which has a foamlike appearance and character, even though it is not a foam, and is useful for purposes previously requiring a foam-backed pressure-sensitive adhesive tape. A foamlike tape of the Levens patent now on the market is made by ultraviolet polymerization of a layer of an adhesive-forming mixture containing colorless glass microbubbles which afford a white color that makes the tape undesirably visible in uses such as sealing a skylight or attaching body-side moldings to automotive vehicles or simulated mullion bars to a glass window. Because of its superior performance characteristics, the foamlike tape of the Levens patent is often preferred to foam-backed tapes for such purposes and would be more acceptable if its adhesive layer were sufficiently dark to camouflage the tape. If carbon black or other pigment were added to the photopolymerizable adhesive-forming mixture in amounts sufficient to produce a desirably dark appearance, this would block the ultraviolet radiation from polymerizing the mixture to a pressure-sensitive adhesive state. Up to about 0.1 or 0.15 percent by weight of carbon black can be employed without undue interference with the polymerization of a 50-micrometer layer, but this results in a pastel gray color that would be undesirably noticeable for most uses such as those mentioned above Glass microbubbles also are used as fillers for other polymeric articles to which they afford lighter weight in addition to advantages provided by other inert fillers such as higher distortion temperature. Lighter weight is of special importance to automotive body parts which also should be pigmented internally in order to mask from view the mechanisms which they cover.

Glass microbubbles can be made according to U.S. Pat. Nos. 3,365,315 (Beck et al.) or 4,391,646 (Howell). Individual microbubbles of the working examples of those patents are colorless

Other Prior Art

Inorganic thin-film coatings, especially of metals, have long been applied to finely divided particulate matter for a variety of purposes. For example, U.S. Pat. No. 4,046,712 (Cairns et al.) concerns the long-known procedure of applying expensive catalytic material such as platinum to a porous body or a powder in order to obtain a large exposed surface area from a given volume of the catalytic material. The Cairns patent concerns a technique for depositing thin-film coatings of catalytic metals onto fine particles, such as alumina spheres, so that the thin-film coatings provide approximately monoatomic coverage of the surface area of the particles.

Wise: "High Dispersion Platinum Catalyst by RF Sputtering", Journal of Catalysis, Vol. 83, pages 477–479 (1983) reports thin-film platinum coatings on powdered alumina 100 micrometers in diameter, which coatings comprise crystallites having average diameters less than 2.5 nm.

In the examples of U.S. Pat. No. 3,192,064 (Cerych et al.), a black porous coating is applied by evaporation of aluminum onto polystyrene spheres and glass spheres. Such coated particles are indicated to be useful as conductive or magnetic inks in electroprinting. The coating consists of condensed metal particles which are sufficiently small (less than 50 nanometers, col. 2, line 24) that the coating substantially completely absorbs incident light by internal reflection and appears black (col. 3, ls. 15–18). Substantially equivalent disclosure is found in an article entitled "Microencapsulation: New Technique and Application", Proceedings of the Third International Symposium of Microencapsulation, Tamotsu Kondo, ed., pages 166–170 (1976). The article says that the "metal film formed according to this process is quite thin, having a thickness on the order of a nanometer" (page 168, lines 1–3), but it is believed that the authors intended to recite a much larger typical thickness.

In U.S. Pat. No. 2,846,971 (Baer et al.), thin-film coatings of a metal such as aluminum or a compound such as silicon oxide are evaporated onto finely divided material such as acetate flock, granular silicon carbide, small ceramic objects and powdered metals. The invention is said to be useful "for preparing abrasive particles for bonding . . . (and) for coating material uniformly with conducting or nonconducting coatings" (col. 1, ls. 26–31).

In British patent specification No. 1,507,667, published Apr. 19, 1978, a thin-film coating of a valve metal such as tantalum is applied to ceramic particles such as alumina, and the coated particles are said to be useful as electrolytic capacitors. The core particles range typically from 2.5 to 30 micrometers, and the thickness of the coatings does not exceed 0.5 micrometer, with a preference indicated from about 1 to 200 nanometers (page 5, line 32).

In U.S. Pat. No. 3,826,226 (Clark), thin-film metal coatings such as gold, silver, copper and aluminum are deposited onto hollow glass spheres ranging from 3 to 1000 micrometers in diameter. Coatings obtained using one ion gun are approximately 20 nm thick, and additional ion guns are used to obtain greater coating thickness. The Clark patent says that "metallic coated filled and hollow glass spheres have been employed in sandwich structures, ablative shielding compositions, and the like, as filler material to control the density of the compositions and to alter the other properties thereof" (col. 1, lines 18–23). The Clark invention specifically concerns improved apparatus for applying such coatings.

DISCLOSURE OF INVENTION

The invention provides coated glass microbubbles which, among other things, can be used to make a pressure-sensitive adhesive tape which is equivalent in performance to the tape of the aforementioned Levens patent and also can have a sufficiently dark appearance to be camouflaged. That dark appearance can be achieved when the glass microbubbles of the tape have an inorganic thin-film coating which has an average thickness up to about 10 nm. Surprisingly, coated glass microbubbles of the invention can afford surprisingly good opacity to the tape without unduly inhibiting photopolymerization of its adhesive matrix. To give the tape a dark appearance to camouflage it, the thickness of the inorganic thin-film coating of the novel coated microbubbles should be at least one nm.

When glass microbubbles which have such an inorganic thin-film coating are used as fillers in other matrices to provide coherent articles other than tapes, they can afford surprisingly good hiding power while also imparting esthetically pleasing colors to normally transparent articles. The good hiding power in part stems from the easy dispersibility of the novel coated microbubbles. When the thin-film coating is a metal, better hiding power is provided when its molar extinction coefficient is high, preferably about $10^5$, as compared to $10^3$–$10^4$ for most organic dyes and pigments.

The color the novel coated microbubbles afford to a normally transparent article may change with changes in thickness of the inorganic thin-film coating. For example, when a thin-film coating of silver is very thin, the coated glass microbubbles afford a yellow color whereas increasingly thick thin-film coatings of silver provide tan, red, dark brown, and finally off-white metallic appearance.

By dispersing the novel coated microbubbles throughout a matrix such as a polymeric matrix, a coherent article of a given volume can contain an extraordinarily high concentration of the material of the inorganic coating by using only a tiny quantity of the material. Consequently, a tiny quantity of inorganic material can absorb electromagnetic radiation such as visible light over a very large area. An even higher concentration of the inorganic coating material can be obtained by crushing the coated microbubbles, either before or while dispersing them in a matrix. For example, the coated microbubbles can be crushed during extrusion. The glass microbubbles are easier to crush when of lower density. Among useful coherent articles in which the novel coated microbubbles may be dispersed are molded polymeric or other plastic articles such as automotive body parts, paints, inks such as magnetic ink, sol gels, and articles of glass which melts below the glass of the coated microbubbles. For many such uses, the inorganic thin-film coating can be quite thin, e.g., 0.05 nm.

Metals believed to be useful for the inorganic thin-film coating include aluminum, silver, tungsten, copper, chromium, zirconium, titanium, nickel, palladium, and platinum. Other useful thin-film coatings include metalloids such as carbon and silicon and alloys containing metals and/or metalloids. Other useful inorganic thin-film coatings are compounds including titanium nitride. Tin oxide or aluminum oxide, each of which provides a colorless thin-film coating, should be useful where coloring or hiding power is not required. All of the named metals, metalloids, and other inorganics can be applied by physical vapor deposition, e.g., by sputtering or by vapor coating. While sputtering is easier to carry out, vapor coating consumes much less energy and so should be far more economical to exploit commercially. Electroless plating, chemical vapor deposition, and other deposition techniques should also be useful.

For use in photopolymerizable matrices, thin-film coatings of silver may be preferred because they are somewhat more transmissive to ultraviolet radiation than they are to visible light. Thin-film coatings of aluminum also are effective and may be preferred to silver because of much lower cost. Thin-film coatings of aluminum, nickel, tin, zinc, titanium, copper, chromium, and tungsten are roughly equally transmissive of both visible and ultraviolet radiation. However, when the novel coated glass microbubbles are used as fillers in a photopolymerizable matrix, it is not known whether a thin-film coating of silver passes a significantly greater proportion of ultraviolet radiation as compared to the other thin-film coatings mentioned above.

A series of thin-film coatings of silver were deposited onto carbon-coated glass slides in thicknesses ranging from 0.5 nm to 8 nm. When examined by transmission electron microscopy, the coatings were discontinuous, appearing as islands, most of which were from 2 to 20 nm in breadth. It is assumed that a thin-film coating of silver of the same thickness on a glass microbubble would also be discontinuous. However, it is not known whether this discontinuity has had any role in the ability of ultraviolet radiation to penetrate a photopolymerizable composition containing the silver-coated glass microbubbles.

The morphologies of metal coatings on glass microbubbles have also been determined. Tungsten coatings of two thicknesses were sputter deposited onto glass microbubbles. These coated glass microbubbles were examined by ion scattering spectroscopy which provides a determination of elements present in the very top (two) atomic layers of the surface analyzed. For a tungsten coating of average thickness 0.3 nm, elements of the underlying glass microbubble surface (K, Ca) as well as the tungsten were detected, indicating that the tungsten coating was discontinuous. For a tungsten coating of average thickness 6.5 nm, essentially only tungsten was detected, indicating that this coating was continuous.

Inorganic thin-film coatings as great as 10 nm in thickness may afford adequate ultraviolet transmission, especially when the microbubble-containing matrix is rather thin or the concentration of coated glass microbubbles is small. On the other hand, the thin-film coating preferably is less than about 5 nm when the matrix is relatively thick, e.g., 1.5–2.5 mm, or has a high microbubble content, e.g., 50–65% by volume. Inorganic thin-film coatings which do not exceed 5 nm allow greater ultraviolet transmission and hence either faster polymerization or less energy expenditure, or both. Thin-film coatings of thicknesses greater than 10 nm can be used in combination with uncoated glass microbubbles or with glass microbubbles having thinner inorganic thin-film coatings as long as the average coating thickness does not exceed 10 nm.

The coated glass microbubbles of the invention should have an average density (ASTM D-2840-69) not exceeding 1.0 g/cm$^3$, and their average diameter should be from 5 to 200 micrometers. Glass microbubbles having an average diameter below 5 micrometers would tend to be unduly expensive. For economy in manufacturing the glass microbubbles to be coated, their average diameter preferably is within the range of 20 to 80 micrometers.

The above-cited Levens patent teaches that the walls of its glass microbubbles should be very thin, both to enhance ultraviolet transmission and because glass microbubbles having thinner walls tend to be less expensive on a volume basis. For the same reasons, in the present invention the average density of the coated glass microbubbles preferably is less than 0.4 g/cm$^3$ and desirably less than 0.2 g/cm$^3$.

The following tests were used to evaluate tapes made with coated glass microbubbles of the invention.

SHEAR VALUE

A strip of tape is adhered by its adhesive to a rigid stainless steel plate with an exactly 1.27-cm square portion of the tape in contact with the panel. Before testing, a 1000 g weight rests over the bonded area for 15 minutes. Then the panel with the adhered tape is placed in the oven which has been preheated to 70° C., and after 15 minutes a 500 gram weight is hung from the free end of the tape, with the panel tilted 2° from the vertical to insure against any peel forces. The time at which the weight falls is the Shear value. If no failure, the test is discontinued at 10,000 minutes. Only cohesive failures are reported.

T-PEEL

T-Peel is measured as in ASTM D-1876-72 except that the test tapes were 0.5 inch (1.27 cm) in width and were tested only two hours after being adhered to aluminum foil backings. Results are reported in Newtons per decimeter (N/dm). Only cohesive failures are reported.

DARKNESS

The darkness of a pressure-sensitive adhesive layer is determined on a Hunter LabScan Spectrocolorimeter using a 10 degree reflectance, Illum=F and the CIE lab scale (L*a*b*) where L*=0 is black and L*=100 is white. Since a* and b* are usually between −5 and +5, they are not reported unless one of them is outside of that range.

COATED GLASS MICROBUBBLES

Used to make the coated glass microbubbles of the examples (except as noted) were colorless glass microbubbles having an average density of 0.15 g/cm3 and an average diameter of 40-60 micrometers. Of these, 79% by weight had a density of less than 1.0 g/cm$^3$ (average density 0.12 g/cm$^3$) and the remaining 21% had a density of more than 1.0 g/cm$^3$.

Coated Glass Microbubbles A

While being tumbled in a vacuum chamber, 150 ml of colorless glass microbubbles were sputter-coated with silver vapor from a sputtering target. The rectangular cathode (12.7 by 20.3 cm) was operated for 33 minutes in the direct current, planar magnetron mode at an applied current of 0.5 amp, with a resulting cathode potential of 420 volts. The argon sputtering gas pressure was 12 millitorr, and the background pressure was about $5\times10^{-5}$ torr. Based on the weight of the silver coated onto the microbubbles, the thickness of the silver coating was estimated to be 1 nm. The coated microbubbles had a dark purple color.

Coated Glass Microbubbles B-N

Additional batches of the colorless glass microbubbles were sputter-coated in the same manner as Coated Glass Microbubbles A except as reported in Table I. Also the average density of the starting colorless microbubbles used to make Coated Glass Microbubbles N was 0.25 g/cm$^3$. The average thickness of each thin-film coating was calculated from the weight % of metal and the average surface area of the glass microbubbles which had been measured by the BET method to be 1.67 m$^2$/g. The calculation employed the equation $$t = (10W/DS)$$

wherein
t = average thickness in nm,
W = weight % of metal,
D = density of the metal in g/cm$^3$, and
S = average surface area of the microbubbles in m$^2$/g.

Coated Glass Microbubbles O

Another batch of the colorless glass microbubbles was sputter-coated in the same manner as Coated Glass Microbubbles N except that nitrogen was admitted to the chamber at a flow rate of 10 scc/min and the coating was titanium nitride.

Weight % of Metal

The weight percent of coated metal reported in Table I was determined by dissolving the coated microbubbles in dilute hydrofluoric acid in combination with other acids, namely HNO$_3$, HCl or H$_2$SO$_4$. The resulting solution was analyzed by Inductively Coupled Argon Plasma Atomic Emission Spectroscopy. Because uncoated microbubbles show 0.24% aluminum, this was subtracted from weight percent determination of aluminum coatings.

The final column of Table I indicates the color of individual coated glass microbubbles when viewed by a microscope at a magnification of 100X using transmitted light.

TABLE I

| Coated Glass Micro-bubbles | Metal Coating | Batch size (ml) | Applied Current (amps) | Potential (volts) | Deposition Rate (nm/min) | Coating Time (min) | Weight % of Metal | Average Thickness (nm) | Color |
|---|---|---|---|---|---|---|---|---|---|
| A | Silver | 150 | 0.5 | 420 | 120 | 33 | 1.79 | 1.0 | Purple |
| B | Silver | 250 | 0.25 | 376 | 60 | 5.5 | 0.13 | 0.07 | Light Tan |
| C | Silver | 200 | 0.25 | 357 | 60 | 27 | 0.70 | 0.4 | Rust Red |
| D | Silver | 200 | 1.0 | 490 | 260 | 41 | 4.14 | 2.4 | Dark Purple |
| E | Aluminum | 200 | 4.0 | 478 | 240 | 30 | 1.89 | 4.2 | Grey |
| F | Aluminum | 200 | 4.0 | 487 | 240 | 12 | 0.29 | 0.6 | Light Grey |
| G | Chromium | 150 | 4.0 | 580 | 58 | 69 | 3.67 | 3.0 | Grey |
| H | Chromium | 150 | 4.0 | 620-675 | 58 | 49 | 2.58 | 2.1 | Grey |
| I | Tungsten | 100 | 1.6 | 400-700 | 100 | 53 | 3.29 | 1.0 | Grey |
| J | Tungsten | 150 | 1.6 | 480-560 | 100 | 45 | 1.94 | 0.6 | Grey |
| K | Tungsten | 150 | 1.6 | 510-570 | 100 | 20 | 1.08 | 0.3 | Grey |
| L | Tungsten | 150 | 2.0 | 560-490 | 150 | 39 | 3.20 | 1.0 | Grey |
| M | Copper | 100 | 0.5 | 480 | 140 | 45 | 2.71 | 1.8 | Green |
| N | Titanium | 100 | 4.0 | 350 | 150 | 60 | 1.20 | 1.6 | Grey |
| O | Titanium nitride | 100 | 4.0 | 430 | 150 | 60 | 1.10 | 1.1 | Grey |

Coated Glass Microbubbles P

While being tumbled in a vacuum chamber with a background pressure of $2 \times 10^6$ torr, 950 ml of the same colorless glass microbubbles were vapor-coated with aluminum from an aluminum wire of 1.3 mm diameter which was evaporated by mechanically driving it for 7 minutes into a ceramic bar maintained at about 1400° C. The wire feed rate was 0.8 gram of aluminum per minute. Aluminum vapor from the ceramic bar was directed towards the tumbled microbubbles. Based upon the weight percent of aluminum coated onto the microbubbles, the thickness of the thin-film aluminum coating was estimated to be 2.1 nm.

Coated Glass Microbubbles Q–U

Additional batches of the colorless glass microbubbles were vapor-coated in the same manner as Coated Glass Microbubbles P except as tabulated in Table II and except that the average density of the starting colorless glass microbubbles used to make Coated Glass Microbubbles S was 0.37 g/cm$^3$.

The knife coater was adjusted to provide a coating thickness of approximately 0.10 to 0.12 mm. The composite emerging from the roll coater passed between two banks of lamps, 90% of the emissions of which were between 300 and 400 nm with a maximum at 351 nm. The exposure was measured by an International Light "Light Bug" which is spectrally responsive between 250 and 430 nm, maximum 350 nm. The composite was cooled by blowing air against both films during the irradiation to keep the temperature of the films below 85° C. to avoid wrinkling of the films.

Products 2–18

Products 2–18 were made in the same way as Product 1 except that Product 2 employed uncoated colorless glass microbubbles as used in making Coated Glass Microbubbles A and was irradiated from only one side and thus received only one-half the amount of radiation. Products 3–18 used coated glass microbubbles as indicated in Table III. Products 3, 10 and 11 also differed from Product 1 in that the polymerizable mixture comprised 90 parts isooctyl acrylate and 10 parts acrylic

TABLE II

| Coated Glass Micro-bubbles | Metal Coating | Feed rate (g/min) | Batch size (ml) | Applied Current (amps) | Potential (volts) | Deposition Rate (nm/min) | Coating Time (min) | Weight % of Metal | Average Thickness (nm) | Color |
|---|---|---|---|---|---|---|---|---|---|---|
| P | aluminum | 0.8 | 950 | 260 | 4.6 | 2300 | 7 | 0.96 | 2.1 | Grey |
| Q | aluminum | 0.8 | 950 | 260 | 4.6 | 2300 | 3 | 0.87 | 1.9 | Grey |
| R | aluminum | 0.8 | 1900 | 290 | 5.6 | 2300 | 19 | 1.73 | 3.9 | Grey |
| S | aluminum | 0.8 | 950 | 260 | 4.2 | 2300 | <30 | 3.1 | 6.9 | Grey |
| T | copper | 2.0 | 1900 | 410 | >10 | 3700 | 8 | 3.14 | 2.1 | Green |
| U | copper | 2.0 | 1100 | 410 | >10 | 3700 | 18 | 4.15 | 2.8 | Grey green |

Coated glass microbubbles were used to make pressure-sensitive adhesive tapes as taught in the above-cited Levens patent. In reporting doing so, all parts are by weight. Test results are in Table III.

Product 1

A syrup of coatable viscosity was prepared by partially polymerizing, as taught in U.S. Pat. No. 4,330,590 (Vesley), a mixture of 87.5 parts isooctyl acrylate, 12.5 parts acrylic acid, and 0.04 part of 2,2-dimethoxy-2-phenyl acetophenone ("Irgacure" 651). To this syrup was added an additional 0.1 part of "Irgacure" 651 and 0.05 part of hexanedioldiacrylate, plus 7.25 parts of Coated Glass Microbubbles A. The resulting mixture was thoroughly mixed slowly with an air stirrer, carefully degassed in a desiccator using a vacuum pump, and fed to the nip of a knife coater between a pair of transparent, biaxially-oriented polyethylene terephthalate films, the facing surfaces of which had low-adhesion coatings.

acid. Product 18 differed from Product 1 in that the coated class microbubbles comprised 5% by weight of the adhesive layer.

Product 19

A syrup of coatable viscosity was prepared by partially polymerizing a mixture of 70 parts of isooctyl acrylate, 30 parts of N-vinylpyrrolidone and 0.04 part of 2,2-dimethoxy-2-phenyl acetophenone ("Irgacure" 651). To this syrup was added an additional 0.1 part of "Irgacure" 651, 0.05 part of hexanedioldiacrylate, and 7.25 parts of Coated Glass Microbubbles M. This was then coated and polymerized as was Product 1.

Products 20–21

Products 20–21 differed from Product 1 in that their amounts of coated glass microbubbles were increased to 8.5 parts.

TABLE III

| Product | Glass Microbubbles | Exposure (mj)$^a$ | Color of Adhesive | Darkness (L*) | Shear Value (min.) | T-Peel (N/dm) |
|---|---|---|---|---|---|---|
| 1 | A | 1000 | dark brown | 21 | 10,000 | 429 |
| 2 | Uncoated | 1000 | white | 94 | 10,000 | 525 |
| 3 | B | 1000 | yellow | 76$^b$ | 4,150 | 409 |
| 4 | C | 1000 | red | 40$^c$ | 6,990 | 445 |
| 5 | D | 700 | dark brown | 22 | @ | @ |
| 6 | E | 800 | black | 25 | 10,000 | 444 |
| 7 | F | 1000 | light grey | 48 | 10,000 | 411 |
| 8 | G | 1000 | black | 19 | 10,000 | 350 |
| 9 | H | 1000 | black | 18 | 10,000 | 316 |
| 10 | I | 1000 | dark grey | 27 | 497 | 250 |
| 11 | J | 1000 | grey | 36 | 10,000 | 360 |
| 12 | K | 1000 | light grey | 54$^d$ | 3,875 | 397 |
| 13 | N | 1000 | black | 23 | 10,000 | |
| 14 | O | 1000 | black | 24 | 10,000 | |

TABLE III-continued

| Product | Glass Microbubbles | Exposure (mj)[a] | Color of Adhesive | Darkness (L*) | Shear Value (min.) | T-Peel (N/dm) |
|---|---|---|---|---|---|---|
| 15 | P | 1000 | dark grey | 28 | 10,000 | |
| 16 | Q | 1000 | grey | 37 | 10,000 | |
| 17 | R | 1000 | black | 25 | @ | @ |
| 18 | R | 1000 | black | 26 | 10,000 | 294 |
| 19 | M | 1000 | black | 22 | 7,140 | |
| 20 | T | 1000 | dark grey | 33[e] | 10,000 | |
| 21 | U | 1000 | green | 39[f] | 132 | |

[a] Exposure from each bank of lamps except Product 2
[b] a* = 4.3; b* = 32
[c] a* = 9.3; b* = 23
[d] a* = 0.2; b* = 7
[e] a* = −0.6; b* = 7
[f] a* = −0.9; b* = 20
@ not completely polymerized

Product 22

Coated Glass Microbubbles S (7.5 g) were dry-blended with linear, low density polyethylene (40 g) having a melt index of one [Union Carbide 7047]. The blend was extruded through a 6 mm die at temperatures of 193° C. (inlet) and 221° C. (outlet) and a pressure of 10341 kPa. This produced an opaque flexible sheet having a uniform gray color and a density of 0.84 g/cm$^3$.

Product 23

To 10 g of an isocyanate prepolymer ("Hypol 3000" of WR Grace) was added 10 g of tap water containing 1 g of Coated Glass Microbubbles G. This was stirred by hand at room temperature and coated at a thickness of 1 mm between two pieces of polyester, becoming a foam, throughout which the microbubbles were thoroughly dispersed as evidenced by a uniformly black color.

Product 24

A syrup of coatable viscosity was prepared by partially polymerizing a mixture of 70 parts of isooctyl acrylate, 30 parts of acrylic acid, and 0.04 part of 2,2-dimethoxy-2-phenyl acetophenone ("Irgacure" 651). To this syrup was added an additional 0.1 part of "Irgacure" 651, 0.05 part of hexanedioldiacrylate, and 7 parts of Coated Glass Microbubbles L. This syrup was coated and polymerized in the same manner as was the adhesive layer of Product 1. The transparent films were peeled off, leaving a brittle, nontacky plastic film which had a thickness of 1.1 mm, a gray color (L*=23) and a density of 0.84 g/cm$^3$.

Product 25

Into 10 g of a hydroxy-functional polyol ("Lexorez 3500-140", Inodex) was mixed 1.5 g of Coated Glass Microbubbles G and then a mixture of 5 g of isocyanate prepolymer ("Desmodur N-100" of Mobay Chemical Corp.) plus 0.005 part of dibutyl tin dilaurate. This was poured into a Petri dish, degassed, and then cured in an oven at 170° C. for 15 minutes to provide a tough, rubbery sheet having a thickness of about 3 mm, black color (L*=17), and a density of 0.61 g/cm$^3$.

Product 26

One part of Coated Glass Microbubbles R was mixed into 20 parts of a clear lacquer (20% solids) which would by itself dry to a satin finish ("Floquill" crystal coat). The mixture was painted onto an aluminum surface and dried to provide a gray color.

We claim:

1. Glass microbubbles having an average density not exceeding 1.0 g/cm$^3$ and an average diameter from 5 to 200 micrometers wherein the improvement comprises:
   the microbubbles have an inorganic thin-film coating having an average thickness not exceeding 10 nm.
2. Glass microbubbles as defined in claim 1 wherein the average thickness of the thin-film coating is at least 0.05 nm.
3. Glass microbubbles as defined in claim 2 wherein the average thickness of the thin-film coating is at least 1 nm.
4. Glass microbubbles as defined in claim 2 wherein the thin-film coating is a metal.
5. Glass microbubbles as defined in claim 2 wherein the metal is selected from aluminum, silver, tungsten, copper, and chromium.
6. Glass microbubbles as defined in claim 2 wherein the thin-film coating is a metalloid selected from carbon and silicon.
7. Glass microbubbles as defined in claim 2 wherein the thin-film coating is titanium nitride.
8. Glass microbubbles as defined in claim 2 wherein the thin-film coating is tin oxide or aluminum oxide.
9. Crushed glass microbubbles as defined in claim 1.
10. A coherent article comprising a matrix filled with glass microbubbles of claim 1, said microbubbles comprising at least five volume percent of the article.
11. The article of claim 10 wherein the average thickness of the thin-film coating is at least one nm.
12. A coherent article comprising a matrix filled with glass microbubbles comprising at least 5 volume percent of the article, wherein the improvement comprises:
    the microbubbles have an inorganic thin-film coating having an average thickness not exceeding 10 nm.
13. An article as defined in claim 12 wherein the average thickness of the thin-film coating is at least 0.05 nm.
14. An article as defined in claim 13 wherein the average density of the coated microbubbles is less than 0.4.
15. An article as defined in claim 14 wherein the average diameter of the microbubbles is from 5 to 200 micrometers.
16. An article as defined in claim 15 wherein the microbubbles comprise from 10 to 65 volume percent of the article.
17. An article as defined in claim 12 wherein the matrix is polymeric.
18. An article as defined in claim 17 wherein said thin-film coating is a metal.
19. An article as defined in claim 18 wherein said metal thin-film coating is discontinuous.
20. An article as defined in claim 18 wherein said metal thin-film coating is continuous.
21. An article as defined in claim 12 the glass microbubbles of which are crushed.

* * * * *